UNITED STATES PATENT OFFICE.

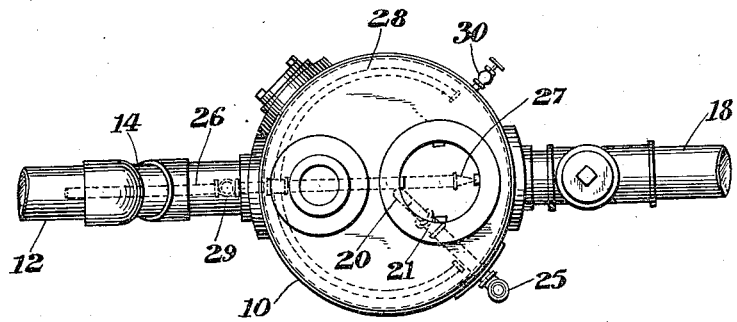
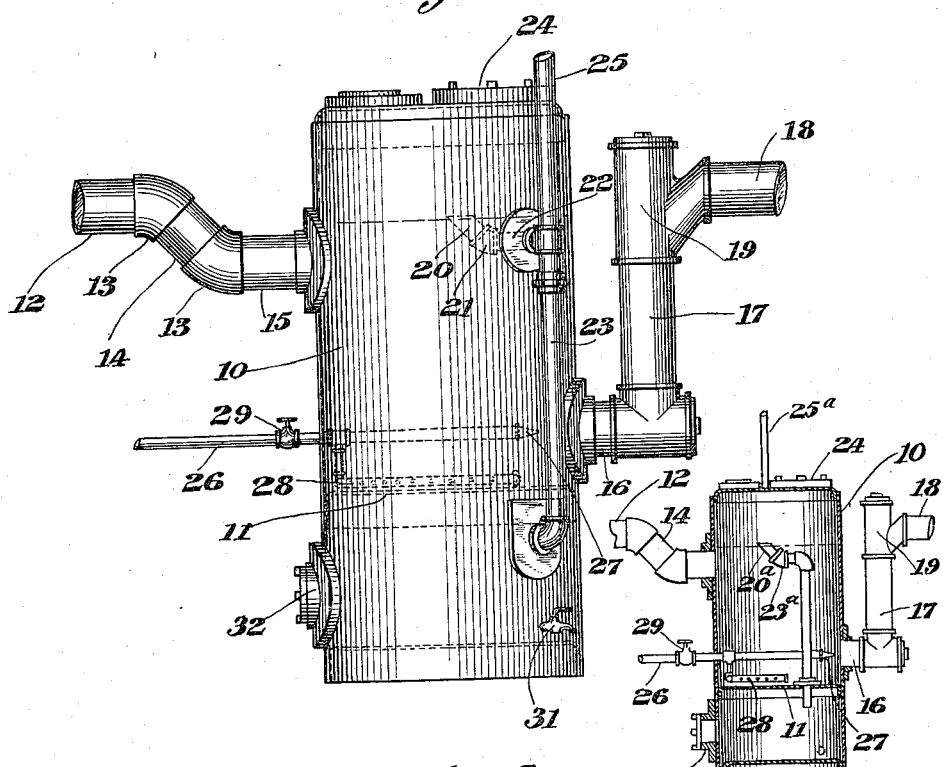

FLOYD W. SCHOCH, OF JERSEY CITY, NEW JERSEY.

OIL-SEPARATOR.

1,173,314.

Specification of Letters Patent. Patented Feb. 29, 1916.

Application filed February 24, 1914. Serial No. 820,393.

*To all whom it may concern:*

Be it known that I, FLOYD W. SCHOCH, a citizen of the United States, and a resident of Jersey City, in the county of Hudson and State of New Jersey, have invented certain new and useful Improvements in Oil-Separators, of which the following is a specification.

This invention relates to oil separators, particularly to oil separators of the overflow type.

One object of the present invention is to provide an oil separator of this character of simple unitary construction which is easy to install and requires a minimum of care to maintain in efficient working condition.

Another object is to provide in a separator of this character simple means whereby the position of the oil overflow may be adjusted according to the amount of the discharge from the drains.

A further object is to provide means whereby any sand or sediment gathering at the bottom of the water chamber may be readily and quickly discharged without requiring the dismantling or detaching of any portion of the apparatus.

The various further objects and advantages will more fully appear in the detailed description and the features of novelty will be particularly pointed out in the claims.

In the drawing illustrating this invention, Figure 1 is an elevation, and Fig. 2 is a plan view of the improved oil separator. Fig. 3 is a diagrammatic sectional view illustrating a modified form of my invention.

Referring in detail to the drawings, the separator consists of a single tank 10, separated by a false bottom 11, into an upper and lower compartment, the former constituting the separating chamber or compartment and the latter constituting the oil reservoir into which the oil separated in the separating chamber is discharged. The inlet pipe 12 leading to the separating chamber from the various drains in the building is located, as in the usual constructions, at a level somewhat below the top of the separating chamber. This pipe has an offset therein adjacent to the tank, preferably formed by 45° elbows 13 and an intermediate inclined nipple 14, and thence the pipe opens into the upper separating chamber through a horizontal nipple 15 connected to the lower elbow 13. Disposed preferably diametrically opposite the inlet pipe is the discharge pipe which leads out from a point adjacent the bottom of the separating chamber. The discharge pipe comprises a lower horizontal section 16 leading from the tank, a vertical section 17 extending therefrom, and a horizontal section 18 connected to the vertical section by a suitable T 19. The pipe 18 is disposed substantially at the same level with the inlet pipe 12, which, together with their connections with the separating chamber, form the U by means of which the oil is separated above the water level in the separating chamber indicated by a broken line.

It will be seen that the water and oil enter the separating chamber in a substantially horizontal direction slightly below the water level in the chamber. Thus, the velocity of the entering water is checked and accordingly any churning sufficient to send particles of oil past the outlet is avoided. By reason of its horizontal entrance, the water spends whatever velocity it may have in a horizontal swirl which does not impart to the oil any appreciable downward velocity. If any particles of oil receive a slight downward velocity, they may travel downward for a short distance, but as the entrance of the water is so near the water level, this downward velocity will not be sufficient to carry the oil clear down to the outlet opening, but will merely send the oil down a short distance, after which it will rise to the top and separate from the water.

To discharge into the lower chamber the oil accumulating above the water level in the upper separating chamber, an adjustable overflow nipple 20 is disposed within the upper chamber at a point adjacent to the water level and connected with a knuckle joint 21 to a nipple 22 extending into the tank, which in turn is connected with a vertical pipe 23 leading to the lower chamber. The nipple 20, forming the mouth of the oil overflow pipe, is adjusted to a position corresponding to the rate of flow of the water in the inlet pipe 12. Thus, if the flow is heavier, the nipple 20 is adjusted to a higher position by swinging the same angularly about the knuckle joint 21, whereas, if the flow is lighter, the nipple 20 is adjusted to a lower position, as for instance, as shown in Fig. 1. The top of the tank may be formed with a hand-hole 24 through which the adjustment may be effected when the installation is made, or at any time thereafter.

If desired, an air vent 25 may form a continuation of the pipe 23 to open the same to the atmosphere for relieving any pressure which may accumulate through the oil vapor.

For cleaning the tank from any sand or sediment which may collect on the bottom of the separating chamber, a water pipe 26 extends into this chamber and terminates in a nozzle 27 substantially in alinement with the section 16 of the discharge pipe. Communicating with the pipe 26 is also a segmental spray pipe 28 disposed closely adjacent the top of the false bottom 11. To clean the bottom of the chamber, it is merely necessary to open the valve 29 in the pipe 26, whereupon the water rushing out through the nozzle 27 and through the spray openings in the pipe 28, stirs up the sand and other sediment and carries the same away through the discharge pipe. The flow of the water at high velocity through the nozzle produces an ejector effect which further facilitates the discharge of the heavy foreign matter.

When a sufficient amount of oil has accumulated at the bottom chamber as indicated by an oil gage 30, the oil may be drawn off through a faucet 31 into a suitable receptacle. It may be understood that instead of the faucet 31 some other drain may be used in case it is desired to pump the oil to a higher level. For cleaning the lower chamber, a suitable hand-hole 32 may be formed in the wall of the tank.

Referring to the modified form illustrated in Fig. 3, the oil overflow pipe 23ᵃ is disposed within the tank and is directly connected with the adjustable nipple 20ᵃ, forming the overflow mouth through which the oil overflows directly into the lower oil chamber of the tank. Otherwise, the construction is substantially the same as in the other form described.

It will thus be seen that I have provided an oil separator which is of the utmost simplicity, being reduced to a minimum number of parts, and is very easily installed and maintained in working order. The water and oil chambers are formed in one unitary tank which forms a compact structure, easy to handle and economical in material and space. Also, this construction of tank with the upper and lower compartments is easy to make of standard parts of sheet iron riveted together as in the ordinary boiler construction. Thus, various sizes can be readily made without carrying extra patterns and other parts in stock. By providing the adjustable overflow, the separator can be readily adjusted for varying conditions of service with a very simple manipulation, requiring very little time and skill. The offset in the inlet pipe tends to check the velocity of flow of the water into the separator and prevents the churning up of the liquid within the upper chamber, thus facilitating the separating of the oil and precluding the carrying down of the same into the discharge pipe. The sand and sediment in the separator may be quickly removed by simple opening of a valve. If it is desired, in the modified form above described, to supply the chambers of the tank with an air vent, a pipe 25ᵃ may be run from the top of the tank. This pipe is open to the atmosphere and will relieve any pressure which may form in either chamber.

Having thus described my invention, I claim as new and desire to secure by Letters Patent:

1. An oil separator comprising a unitary tank, a horizontal partition therein dividing the interior of the tank into an upper and lower compartment, a substantially horizontal inlet leading unobstructedly into the upper compartment slightly below the water level therein, and an outlet leading from the upper compartment adjacent the bottom thereof on the side opposite from the inlet, said outlet comprising a vertical pipe section and a horizontal pipe section extending therefrom, said horizontal section being disposed substantially on a level with the water level in the inlet pipe, and an overflow pipe for the oil connecting the upper and lower compartments, said overflow pipe comprising a mouth opening adjacent to the water level in the upper compartment, and a communicating pipe section leading therefrom into the lower compartment to discharge the oil into said lower compartment.

2. An oil separator comprising a unitary tank, a horizontal partition therein dividing the interior of the tank into an upper and lower compartment, an inlet pipe leading substantially horizontally into the upper compartment below the water level therein, said inlet pipe comprising an offset portion located adjacent to the tank, and an outlet leading from the upper compartment adjacent the bottom thereof comprising a vertical pipe section, and a horizontal pipe section extending therefrom, said horizontal section being disposed substantially on a level with the water level in the inlet pipe, and an overflow pipe for the oil connecting the upper and lower compartments, said overflow pipe comprising a mouth opening adjacent to the water level in the upper compartment, and a communicating pipe section leading therefrom into the lower compartment to discharge the oil into said lower compartment.

3. In an oil separator, a tank comprising a separating chamber, an inlet pipe leading thereto at a point adjacent the top thereof, an outlet pipe opening from the bottom of the separating chamber, a vertical pipe leading from the outlet, means for receiving the overflow oil above the water level in the separating chamber, and means for cleansing the separating chamber from sand and sediment comprising a water pipe opening into the separating chamber, and a spray pipe leading from said water pipe and disposed at the bottom of the separating chamber adjacent the outlet.

4. In an oil separator, a tank comprising a separating chamber, an inlet pipe leading thereto at a point adjacent the top thereof, an outlet pipe opening from the bottom of the separating chamber, a vertical pipe leading from the outlet, means for receiving the overflow oil above the water level in the separating chamber, means for cleansing the separating chamber from sand and sediment comprising a water pipe opening into the separating chamber, a nozzle connected to the water pipe disposed in alinement with the outlet, and a spray pipe connected to the water pipe and disposed at the bottom of the separating chamber.

Signed at New York city, in the county of New York, and State of New York, this 17th day of February, A. D. 1914.

FLOYD W. SCHOCH.

Witnesses:
WM. I. COHEN,
NATHAN COHEN.

Copies of this patent may be obtained for five cents each, by addressing the "Commissioner of Patents, Washington, D. C."